(12) United States Patent
Foster et al.

(10) Patent No.: US 11,117,752 B2
(45) Date of Patent: Sep. 14, 2021

(54) AUTOMATED DOLLY ASSEMBLIES WITH LOADING AND UNLOADING RACKS

(71) Applicant: TOYOTA MOTOR ENGINEERING & MANUFACTURING NORTH AMERICA, INC., Plano, TX (US)

(72) Inventors: Scottie L. Foster, Lawrenceburg, KY (US); Bradley J. Garcia, Louisville, KY (US); Lloyd R. Holland, Georgetown, KY (US); Michael C. Greenlee, Paris, KY (US); Eric F. Cornett, Georgetown, KY (US); Randall L. Johnson, Lexington, KY (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 17 days.

(21) Appl. No.: 16/688,524

(22) Filed: Nov. 19, 2019

(65) Prior Publication Data
US 2021/0147153 A1 May 20, 2021

(51) Int. Cl.
| | | |
|---|---|---|
| *B65G 35/06* | (2006.01) | |
| *B61B 13/12* | (2006.01) | |
| *B65G 1/06* | (2006.01) | |
| *B65G 1/10* | (2006.01) | |

(52) U.S. Cl.
CPC .............. *B65G 35/06* (2013.01); *B61B 13/12* (2013.01); *B65G 1/065* (2013.01); *B65G 1/10* (2013.01); *B65G 2811/09* (2013.01)

(58) Field of Classification Search
CPC ........ B61B 10/00; B61B 13/00; B61B 13/12; B65G 35/06; B65G 2811/09

USPC ........ 104/175; 187/404, 407, 411; 414/594, 414/673
See application file for complete search history.

(56) References Cited

U.S. PATENT DOCUMENTS

| | | | | |
|---|---|---|---|---|
| 496,236 A | * | 4/1893 | Smithman ................. | B66C 7/00 104/175 |
| 825,246 A | * | 7/1906 | Seaman et al. .......... | B65G 1/08 414/594 |
| 936,828 A | * | 10/1909 | Stevens ..................... | B66C 7/00 104/175 |

(Continued)

FOREIGN PATENT DOCUMENTS

| | | |
|---|---|---|
| CN | 207061039 U | 3/2018 |
| CN | 207107715 U | 3/2018 |

*Primary Examiner* — James Keenan
(74) *Attorney, Agent, or Firm* — Dinsmore & Shohl LLP (57) ABSTRACT

Embodiments of the disclosure relate to automated dolly assemblies having loading and unloading racks and traveling along a track secured to a floor. In one embodiment, an automated dolly assembly includes a moveable frame having a mobility mechanism, one or more loading racks, one or more unloading racks, a receiver arm connected to the moveable frame and a moveable pulley connected to the receiver arm. The moveable pulley has weights. The mobility mechanism is coupled to a bottom surface of the moveable frame. The one or more loading racks and the one or more unloading racks are proximate to a top surface of the moveable frame. The receiver arm is rotatably moveable between a horizontal position and a vertical position and configured to engage the automated dolly assembly with an overhead conveyor.

20 Claims, 6 Drawing Sheets

(56) References Cited

U.S. PATENT DOCUMENTS

| | | | | |
|---|---|---|---|---|
| 1,251,117 | A | * | 12/1917 | Savage ................ A63H 29/08 |
| | | | | 414/594 |
| 2,212,711 | A | * | 8/1940 | MacIsaac ................ B66B 9/16 |
| | | | | 414/639 |
| 2,599,444 | A | * | 6/1952 | Gavin ...................... B66C 7/00 |
| | | | | 104/175 |
| 2,941,681 | A | * | 6/1960 | Reyes .................... B66B 17/26 |
| | | | | 414/594 |
| 3,075,656 | A | | 1/1963 | Pearne |
| 3,592,294 | A | * | 7/1971 | Allen ........................ B66F 9/02 |
| | | | | 187/241 |
| 4,098,395 | A | * | 7/1978 | Olsson ................... B65G 35/06 |
| | | | | 198/738 |
| 5,425,464 | A | * | 6/1995 | Hannen ................... B25J 9/023 |
| | | | | 187/404 |
| 5,779,428 | A | * | 7/1998 | Dyson .................... B65G 13/11 |
| | | | | 193/35 A |
| 6,997,666 | B1 | | 2/2006 | Rodgers et al. |
| 7,261,511 | B2 | * | 8/2007 | Felder ...................... B23Q 7/10 |
| | | | | 414/331.07 |
| 8,162,302 | B2 | | 4/2012 | Turner et al. |
| 9,327,952 | B1 | * | 5/2016 | Kolharkar ................ B66F 9/07 |

\* cited by examiner

AUTOMATED DOLLY ASSEMBLIES WITH LOADING AND UNLOADING RACKS

TECHNICAL FIELD

The present specification generally relates to devices utilized in assisting an assembly line worker and, more specifically, to automated dolly assemblies having loading and unloading racks and traveling along a track secured to a floor.

BACKGROUND

In vehicle assembly line manufacturing processes, workparts are often attached to workpart carriers that travel along a rail of an overhead conveyor system. Automated dolly assemblies utilized in stabilizing workpart carriers only enable the workpart carriers to carry large objects like vehicle doors. It is thus desirable to have automated dolly assemblies designed for loading, carrying, and unloading objects of small and medium sizes back and forth between different sections of the assembly line in order to improve efficiency in performing manufacturing operations in assembly line manufacturing processes.

SUMMARY

The present specification relates to automated dolly assemblies having loading and unloading racks and traveling along a track secured to a floor. In one embodiment, an automated dolly assembly includes a moveable frame having a mobility mechanism, one or more loading racks, one or more unloading racks, a receiver arm connected to the moveable frame and a moveable pulley connected to the receiver arm. The moveable pulley has weights. The mobility mechanism is coupled to a bottom surface of the moveable frame. The one or more loading racks and the one or more unloading racks are proximate to a top surface of the moveable frame. The receiver arm is rotatably moveable between a horizontal position and a vertical position and configured to engage the automated dolly assembly with an overhead conveyor.

In another embodiment, a system includes an automated dolly assembly and a rack assembly. The automated dolly assembly includes a moveable frame having a mobility mechanism, one or more loading racks, one or more unloading racks, a receiver arm connected to the moveable frame and a moveable pulley connected to the receiver arm. The moveable pulley has weights. The mobility mechanism is coupled to a bottom surface of the moveable frame and configured to move along a track secured to a floor. The one or more loading racks and the one or more unloading racks are proximate to a top surface of the moveable frame. The receiver arm is rotatably moveable between a horizontal position and a vertical position and configured to engage the automated dolly assembly with an overhead conveyor to move the automated dolly assembly along the track. The rack assembly includes one or more loading shelves and one or more unloading shelves. The one or more loading shelves are configured to align with and receive objects from the one or more unloading racks. The one or more unloading shelves are configured to align with and transfer objects to the one or more loading racks.

In yet another embodiment, a system includes an automated dolly assembly, a rack assembly, a track secured to a floor and an overhead conveyor. The automated dolly assembly includes a moveable frame having a mobility mechanism, one or more loading racks, one or more unloading racks, a receiver arm connected to the moveable frame and a moveable pulley connected to the receiver arm. The moveable pulley has weights. The mobility mechanism is coupled to a bottom surface of the moveable frame. The one or more loading racks and the one or more unloading racks are proximate to a top surface of the moveable frame. The receiver arm is rotatably moveable between a horizontal position and a vertical position. The rack assembly includes one or more loading shelves and one or more unloading shelves. The one or more loading shelves are configured to align with and receive objects from the one or more unloading racks. The one or more unloading shelves are configured to align with and transfer objects to the one or more loading racks. The track is configured to accommodate the mobility mechanism. The overhead conveyor is configured to be engaged with the automated dolly assembly when the receiver arm is in a vertical position to move the automated dolly assembly along the track.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Various embodiments described herein are directed to an automated dolly assembly having loading and unloading racks and traveling along a track secured to a floor. The automated dolly assembly has a receiver arm that rotates between a horizontal and a vertical position and a moveable pulley system with weights that are raised when the receiver arm moves to a vertical position and are lowered when the receiver arm moves to a horizontal position. The automated dolly assembly engages with an overhead conveyor with the receiver arm in the vertical position and moves along the track until it is stopped by an impediment structure coupled to the track. As the automated dolly assembly aligns with a rack assembly adjacent to the track, the overhead conveyor pushes past the receiver arm, which rotates back from the vertical position to a horizontal position. Objects from the unloading racks are transferred to the rack assembly and objects from the rack assembly are received on the loading racks. Subsequently the lowered weights on the moveable pulley drive the automated dolly assembly back to its initial position with respect to the rack assembly. The embodiments described herein facilitate loading, carrying, and unloading objects of small and medium sizes back and forth between different sections of the assembly line in order to improve efficiency in performing manufacturing operations in assembly line manufacturing processes. Various other aspects of the disclosure and variations thereof are illustrated or implied through the descriptions of the embodiments below.

Figure 1:
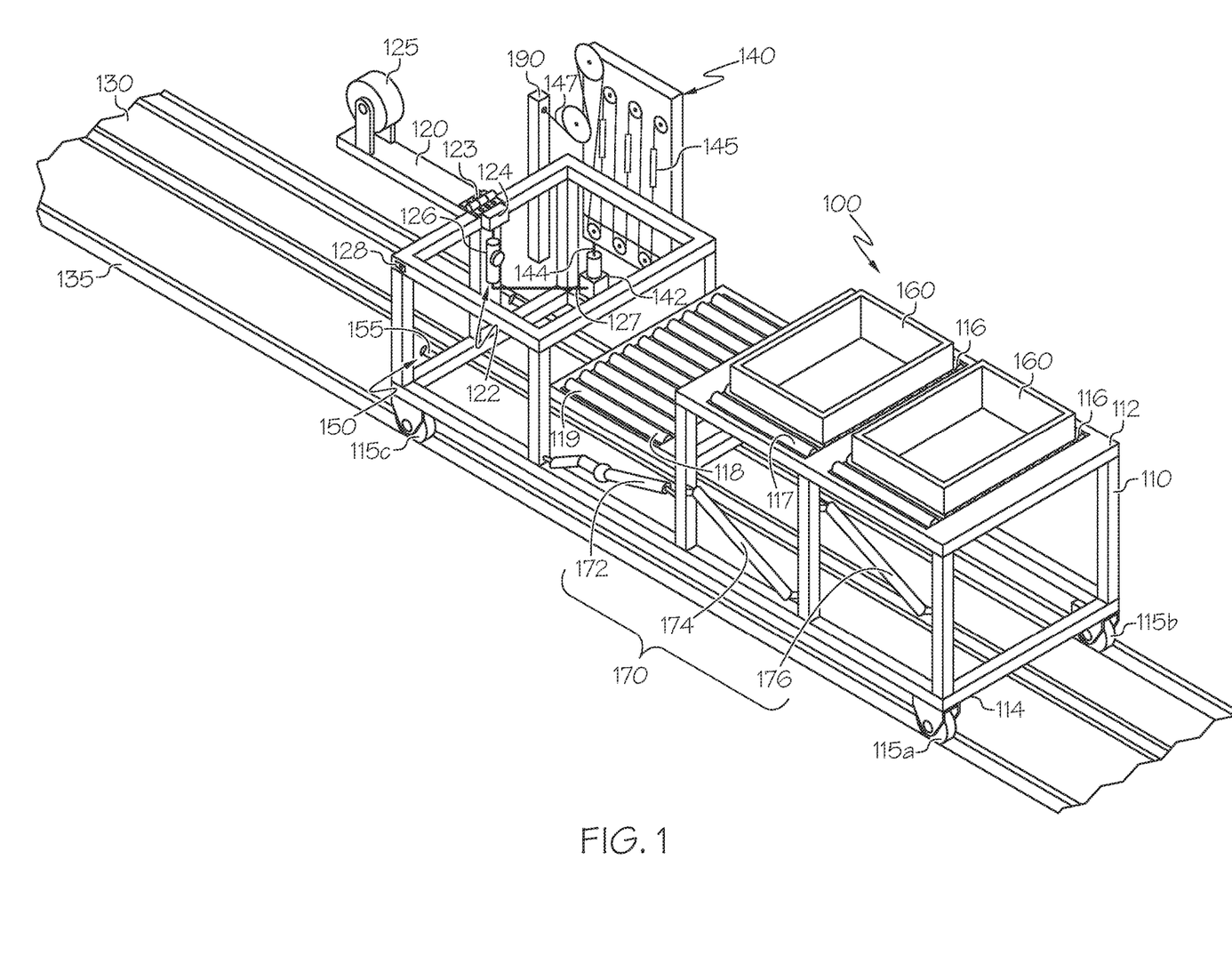
FIG. 1 depicts a perspective view of an automated dolly assembly configured to move along a track secured to a floor, according to one or more embodiments shown and described herein.

FIG. 1 depicts a perspective view of an example automated dolly assembly 100 utilized in assisting an assembly line worker on a manufacturing floor. The automated dolly assembly 100 has a moveable frame 110 with a top surface 112 and a bottom surface 114. The moveable frame 110 may be constructed from a material such as, but not limited to, steel, iron, aluminum, wood, plastic, polymers and the like. The moveable frame 110 may be assembled in any suitable shape and/or size dimensions for a particular application. In the non-limiting embodiment shown in FIG. 1, the moveable frame 110 is constructed from squared steel tubing.

The moveable frame 110 has a mobility mechanism in the form of a plurality of wheels 115a, 115b, 115c, and 115d coupled to the perimeter of the bottom surface 114 and configured to move along guide rails 135 of a track 130 secured to the manufacturing floor. In other embodiments, the mobility mechanism may be a coaster system that comprises bearings attached to the bottom surface 114 of the automated dolly assembly 100. The bearings may ride along the top and the bottom of a grooved bar (grooves enable the bearings to travel within) disposed on or within floor surface, and may be adjustable to properly tension the coaster system. While in the embodiment shown in FIG. 1, the track 130 includes guide rails 135 to accommodate the mobility mechanism, in other embodiments, different configurations of accommodating the mobility mechanism may be used, depending on the mobility mechanism implemented.

The automated dolly assembly 100 includes one or more loading racks 116 and one or more unloading racks 118 proximate to the top surface 112 of the moveable frame 110. Each loading rack 116 has a plurality of rollers 117 that can move a loaded tray 160 along their circumference. The loaded tray 160 may be used for temporarily storing and carrying workpart accessories, tools, tool holsters, etc. in the assembly line. Each unloading rack 118 has a plurality of rollers 119 that can move an empty tray (not shown) along their circumference. While in the embodiment shown in FIG. 1, the automated dolly assembly 100 has two loading racks 116, other embodiments may include more than two or less than two loading racks 116. Similarly, while in the embodiment shown in FIG. 1, the automated dolly assembly 100 has one unloading rack 118, other embodiments may include more than one loading rack 118.

The moveable frame 110 of the automated dolly assembly 100 includes a linkage system 170 having a first linkage 172, a second linkage 174 and a third linkage 176. The linkage system 170 is configured to align the automated dolly assembly 100 with a rack assembly 200, described below with respect to FIG. 2, such that objects from the one or more loading racks 116 are transferred to the rack assembly 200 and objects from the rack assembly 200 are received on the one or more unloading racks 118. One or more locking mechanisms 155 are mechanically connected to a front end 150 in the direction of motion of the moveable frame 110 of the automated dolly assembly 100. The locking mechanisms 155 are configured to connect with an impediment structure 300 (shown in FIG. 3) such that the automated dolly assembly 100 aligns with the rack assembly 200.

A receiver arm 120 is mechanically coupled to the front end 150 of the moveable frame 110 of the automated dolly assembly 100. The receive arm 120 includes a wheel 125 for engaging with an overhead conveyor 350 (shown in FIG. 3) in order to move the automated dolly assembly 100 along the track 130 on a predetermined path that mirrors the path of the overhead conveyor 350. The receiver arm 120 is configured for rotational movement between a horizontal position and vertical position around a hinge 123. The hinge 123 is operated by a firing mechanism 122. The firing mechanism 122 may utilize any structure and/or method useful in powering movement of the receiver arm 120. Non-limiting examples include pneumatics, hydraulics, electric motors and the like. In the non-limiting embodiment shown in FIG. 1, the firing mechanism 122 is pneumatic in nature. The firing mechanism 122 includes a valve 124 coupled to the hinge 123 and a regulated air cylinder 126 connected to the valve 124. The regulated air cylinder 126 is configured to release pressurized air through the valve 124 which drives the rotational movement of the receiver arm 120 about the hinge 123 between a horizontal position and vertical position.

A switch 128 is disposed on the moveable frame 110 and configured to control the flow of air into the regulated air cylinder 126 and thus indirectly controls the hinge 123 and hence the receiver arm 120. Accordingly, the switch 128 controls at least a portion of the firing mechanism 122. While in the embodiment shown in FIG. 1, the switch 128 is a push-button switch disposed near the front end 150 of the moveable frame 110, the switch 128 may take other forms and locations on the moveable frame 110. A worker may activate the switch 128 by pressing down on it and thus control the firing mechanism 122 to move the receiver arm 120 between a horizontal position and vertical position.

Figure 2:
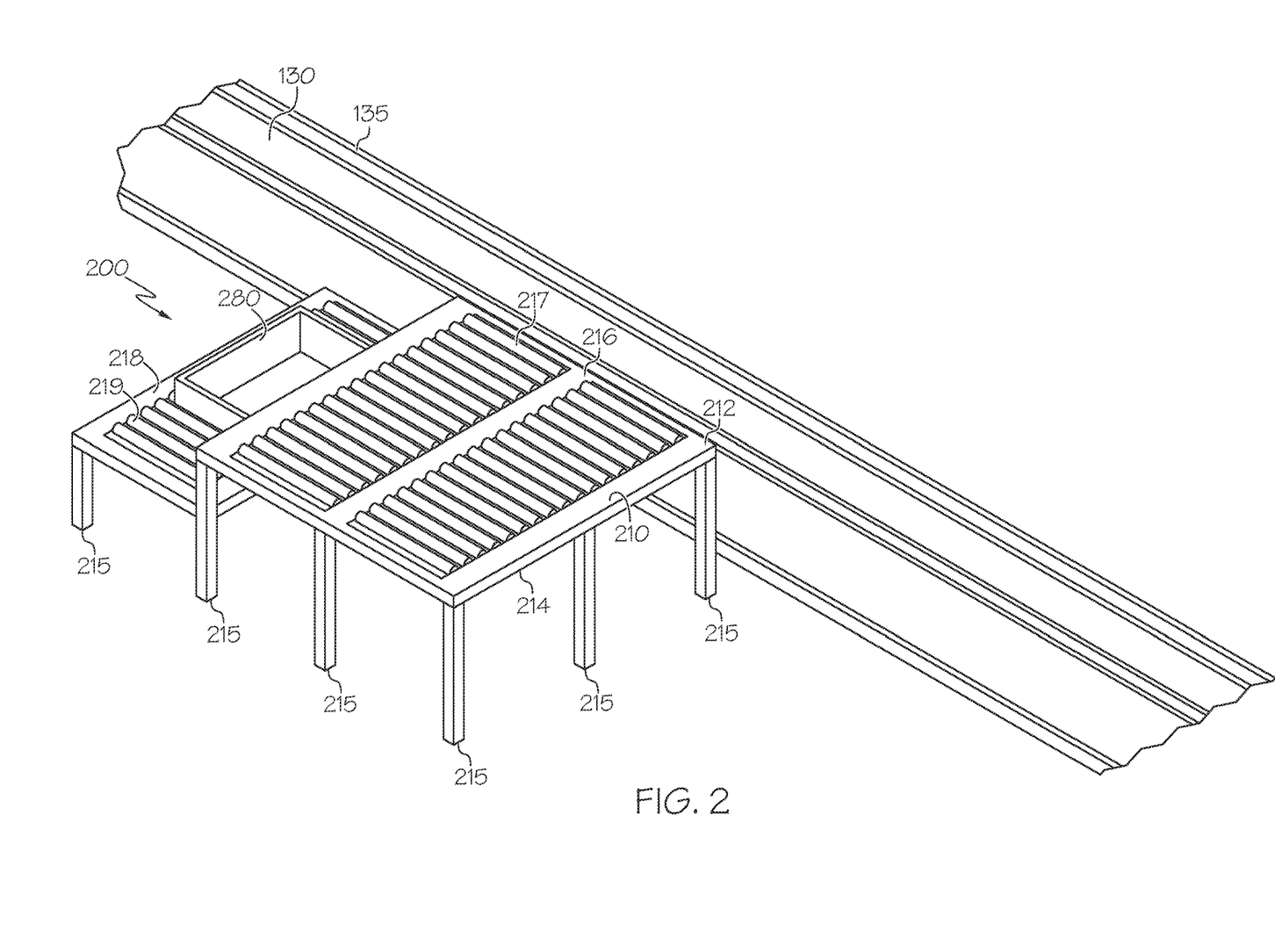
FIG. 2 depicts a perspective view of a rack assembly positioned at a distance from the automated dolly assembly of FIG. 1 adjacent to the track, according to one or more embodiments shown and described herein.

The moveable frame 110 of the automated dolly assembly 100 also includes a moveable pulley 140 having weights 145. One end of the weights 145 is connected, through a cable 147, to a pole 190 fixed on the manufacturing floor and adjacent to the track 130. The opposite end of the weights is connected, through a cable 144, to a tool balancer 142. The tool balancer 142 is connected to the regulated air cylinder 126 through a connecting wire 127. Accordingly the moveable pulley 140 is connected to the receiver arm 120 such that the weights 145 are configured to be raised when the receiver arm 120 moves from a horizontal position to a vertical position and lowered when the receiver arm 120 moves from a vertical position to a horizontal position FIG. 2 depicts a perspective view of the rack assembly 200, which is positioned adjacent to the track 130 at some distance from the automated dolly assembly 100 of FIG. 1. The rack assembly 200 includes a frame 210 with a top surface 212, a bottom surface 214 and a plurality of legs 215. The rack assembly 200 includes one or more loading shelves 218 and one or more unloading shelves 216 proximate to the top surface 212. Each loading shelf 218 is configured to align with the one or more unloading racks 118 of the automated dolly assembly 100 and has a plurality of rollers 219 that can move an empty tray 280 along their circumference. The empty tray 280 may be used for temporarily storing and removing workpart accessories, tools, tool holsters, etc. in the assembly line. Each unloading shelf 216 is configured to align with the one or more loading racks 116 of the automated dolly assembly 100 and has a plurality of rollers 217 that can move a loaded tray 160 (discussed above with respect to FIG. 1) along their circumference. While in the embodiment shown in FIG. 2, the rack assembly 200 has two unloading shelves 216, other embodiments may include more than two or less than two unloading shelves 216. Similarly, while in the embodiment shown in FIG. 2, the rack assembly 200 has one loading shelf 218, other embodiments may include more than one loading shelf 218.

Figure 3:
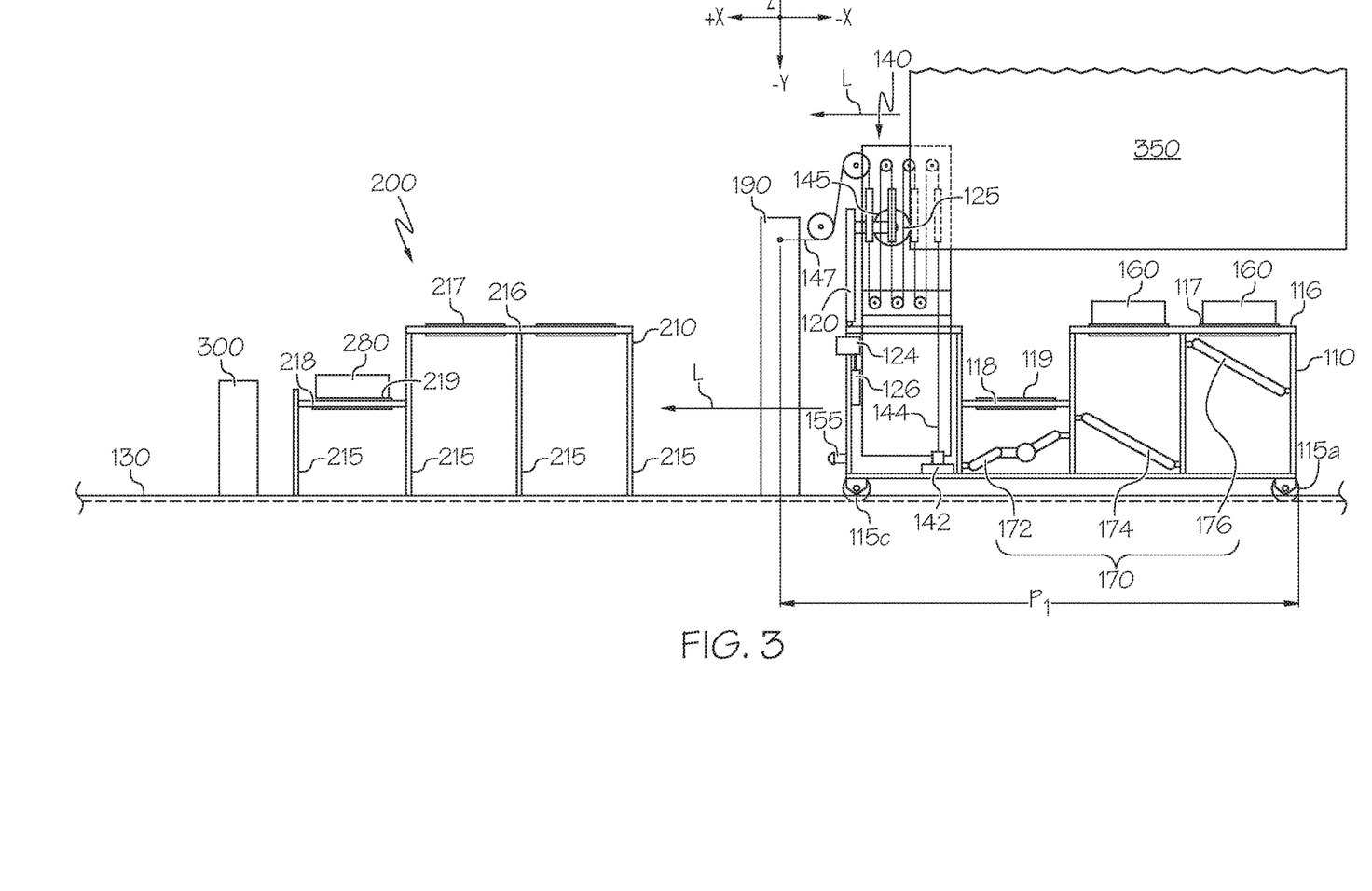
FIG. 3 depicts a schematic side view of the automated dolly assembly of FIG. 1 as it initiates motion towards the rack assembly of FIG. 2, according to one or more embodiments shown and described herein.

In operation, the automated dolly assembly 100 and the rack assembly 200 can be conveniently used to load, store, carry, and unload objects of small and medium sizes back and forth between different sections of the assembly line. FIG. 3 depicts a schematic side view of the automated dolly assembly 100 as it initiates motion towards the rack assembly 200 from a distance $P_1$ behind the post 190. A worker presses the switch 128 to release pressurized air in the regulated air cylinder 126 through the valve 124 such that the receiver arm 120 rotates around the hinge 123 to a vertical position. An overhead conveyor 350 moving along an overhead path engages with the receiver arm 120 in the vertical position and moves the automated dolly assembly 100 along the track 130.

Figure 4:
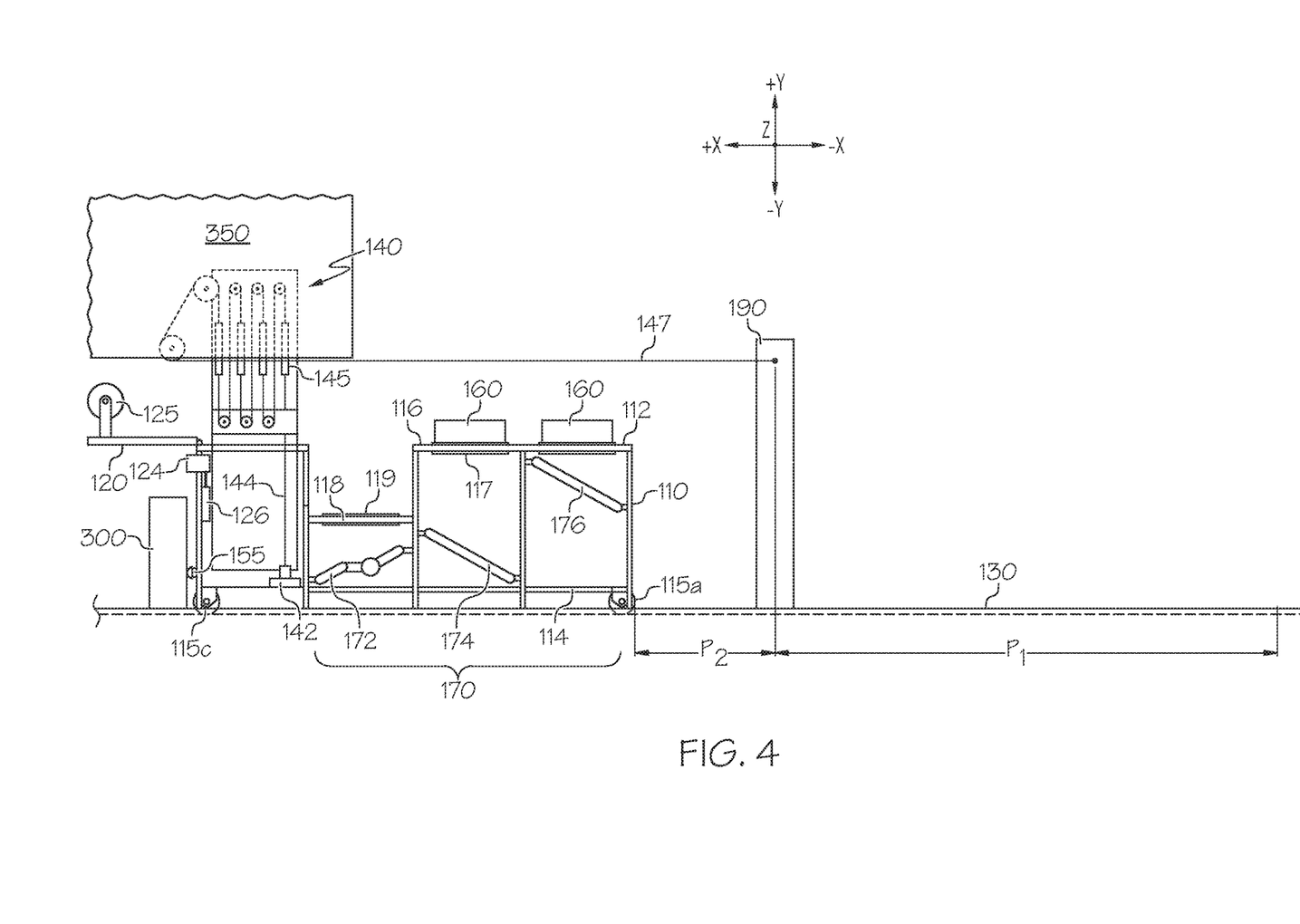
FIG. 4 depicts a schematic side view of the automated dolly assembly of FIG. 1 as it aligns with the rack assembly of FIG. 2, according to one or more embodiments shown and described herein.

Referring now to FIG. 4, after traveling a distance $P_2$ past the post 190 in the L direction, the automated dolly assembly 100 is stopped by an impediment structure 300 coupled to the track 130. The locking mechanisms 155 connect with the impediment structure 300 such that the automated dolly assembly 100 is aligned with the rack assembly 200. FIG. 4 depicts a schematic side view of the automated dolly assembly 100 as it aligns with the rack assembly 200. At this point, the automated dolly assembly 100 has traveled distance $(P_1+P_2)$ along the track 130 in the L direction to align with the rack assembly 200.

Figure 5:
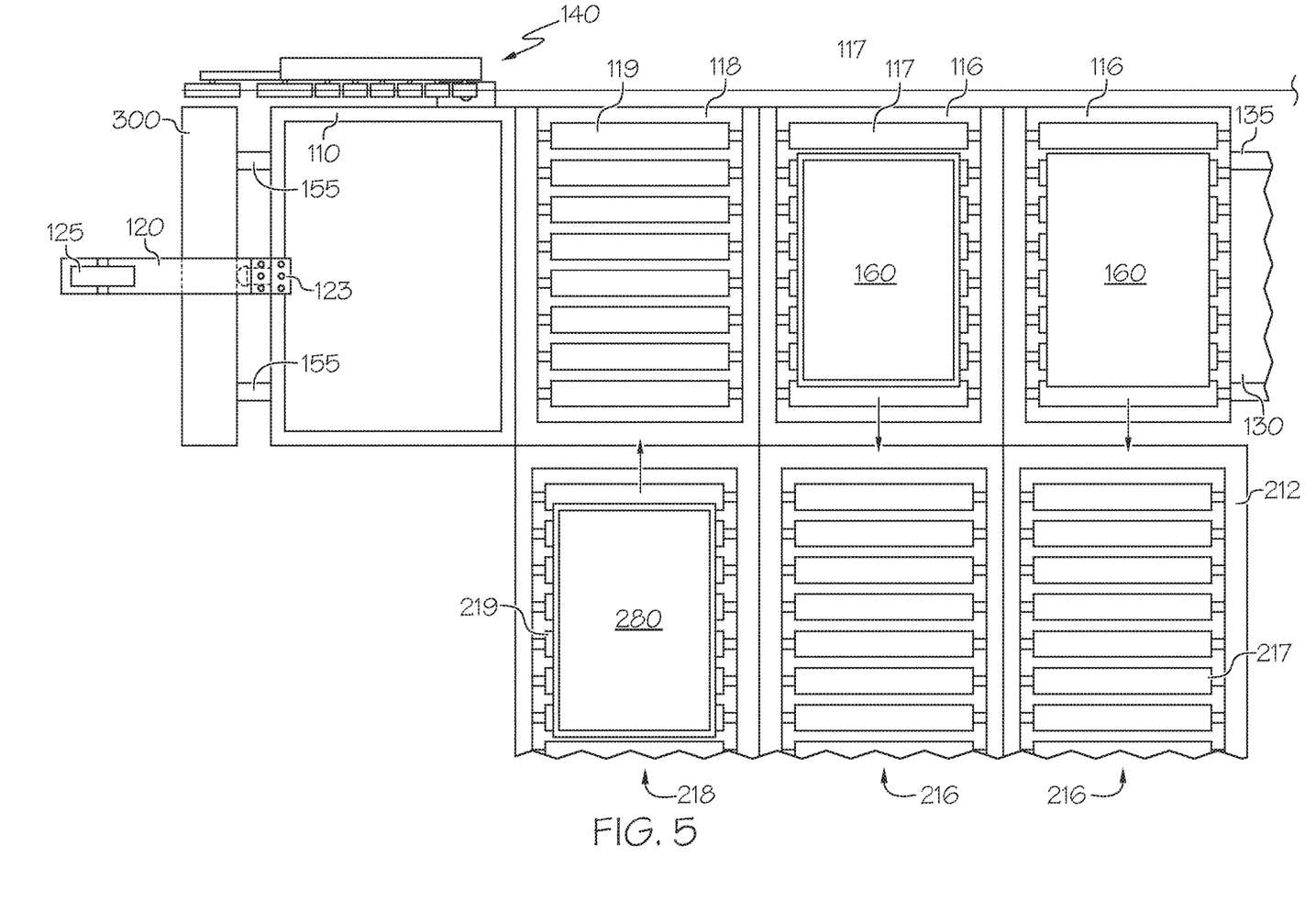
FIG. 5 depicts a top view of the automated dolly assembly of FIG. 1 as it aligns with the rack assembly of FIG. 2, according to one or more embodiments shown and described herein.

The linkage system 170 of the automated dolly assembly is then actuated such that the loading racks 116 of the automated dolly assembly 100 are aligned with the unloading shelves 216 of the rack assembly 200 and the unloading rack 118 of the automated dolly assembly 100 is aligned with the loading shelves 218 of the rack assembly 200. FIG. 5 depicts a top view of the automated dolly assembly 100 as it aligns with the rack assembly 200. The loaded trays 160 from the loading racks 116 of the automated dolly assembly 100 are transferred to the unloading shelves 216 of the rack assembly 200. At the same time, the empty tray 280 is transferred from the loading shelf 218 of the rack assembly 200 to the unloading rack 118 of the automated dolly assembly 100.

Figure 6:
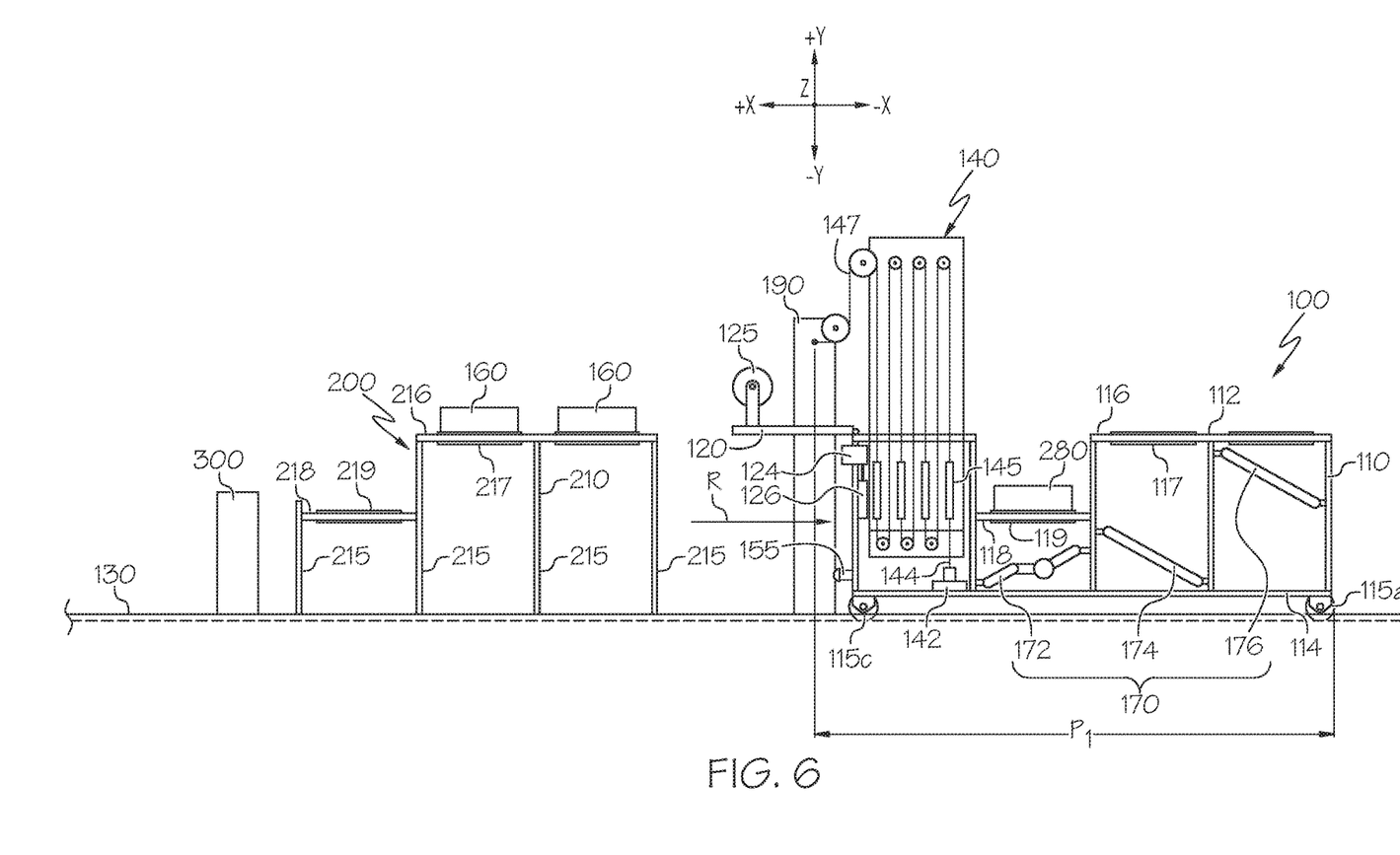
FIG. 6 depicts a schematic side view of the automated dolly assembly of FIG. 1 after it moves back from the rack assembly of FIG. 2 and returns to its initial position, according to one or more embodiments shown and described herein.

As the automated dolly assembly 100 aligns with the rack assembly 200, the overhead conveyor pushes past the receiver arm 120, which rotates back to a horizontal position. As a result of the rotational motion of the receiver arm 120, the weights 145 on the moveable pulley 140 are lowered which drive the automated dolly assembly 100 in the R direction, opposite to the L direction such that it travels the distance $(P_1+P_2)$ back to its initial position with respect to the rack assembly 200, as shown in FIG. 6, which depicts a schematic side view of the automated dolly assembly 100 after it has moved back from the rack assembly 200 to return to its initial position.

The automated dolly assembly described herein can be advantageously used to improve efficiency in performing manufacturing operations in assembly line manufacturing processes. A worker or technician is not required to carry the loaded trays 160 by hand or push a dolly with the loaded trays 160 along the assembly line, which significantly reduces their physical burden during assembly line operations. The amount of time and energy spent in carrying the loaded trays 160 by hand or pushing a dolly with the loaded trays 160 is saved as well. Further, larger and heavier objects can be transported along the assembly line without regard to limits of a worker's carrying or pushing ability. Finally, the energy generated from the motion of the overhead conveyor is used to move the automated dolly assembly up and a pulley connected to a fixed pole on the ground is used to bring the automated dolly assembly down. This saves a lot of energy as there is no need for a separate drive motor to move the automated dolly assembly.

It is noted that the terms "substantially" and "about" may be utilized herein to include the inherent degree of uncertainty that may be attributed to any quantitative comparison, value, measurement, or other representation. These terms are also utilized herein to represent the degree by which a quantitative representation may vary from a stated reference without resulting in a change in the basic function and intended scope of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automated dolly assembly comprising:
   a moveable frame comprising:
      a mobility mechanism coupled to a bottom surface of the moveable frame;
      one or more loading racks and one or more unloading racks proximate to a top surface of the moveable frame; and
      a receiver arm connected to the moveable frame, the receiver arm rotatably moveable between a horizontal position and a vertical position and configured to engage the automated dolly assembly with an overhead conveyor; and
   a moveable pulley located at and coupled to the moveable frame so as to move with the moveable frame when the receiver arm is engaged to the overhead conveyor, the moveable pulley comprising weights and connected to the receiver arm.

2. The automated dolly assembly of claim 1, wherein the mobility mechanism comprises a plurality of wheels.

3. The automated dolly assembly of claim 1, wherein the mobility mechanism is configured to move along a track secured to a floor.

4. The automated dolly assembly of claim 1, wherein the one or more loading racks are configured to receive objects from a rack assembly.

5. The automated dolly assembly of claim 1, wherein the one or more unloading racks are configured to transfer objects to a rack assembly.

6. The automated dolly assembly of claim 1, wherein engagement of the receiver arm to the overhead conveyor causes the weights of the moveable pulley to be raised as the moveable frame moves with the overhead conveyor and movement of the receiver arm to a horizontal position releases the movable frame from the overhead conveyor and causes the weights of the moveable pulley to lower thereby returning the moveable frame to an initial position.

7. The automated dolly assembly of claim 1 further comprising:
   a firing mechanism comprising a regulated air cylinder and a valve for moving the receiver arm; and
   a switch disposed on the moveable frame to control the movement of the receiver arm.

8. The automated dolly assembly of claim 1, wherein the moveable frame further comprises a height configured to align with a rack assembly such that objects from the one or more unloading racks are transferred to the rack assembly and objects from the rack assembly are received on the one or more loading racks.

9. A system comprising:
   an automated dolly assembly comprising:
      a moveable frame comprising:
         a mobility mechanism coupled to a bottom surface of the moveable frame and configured to move along a track secured to a floor;
         one or more loading racks and one or more unloading racks proximate to a top surface of the moveable frame; and
         a receiver arm connected to the moveable frame, the receiver arm rotatably moveable between a horizontal position and a vertical position and configured to engage the automated dolly assembly with an overhead conveyor to move the automated dolly assembly along the track; and
         a moveable pulley located at and coupled to the moveable frame so as to move with the moveable frame when the receiver arm is engaged to the overhead conveyor, the moveable pulley comprising weights and connected to the receiver arm; and
      a rack assembly comprising:
         one or more loading shelves configured to align with the one or more unloading racks to receive objects therefrom; and
         one or more unloading shelves configured to align with the one or more loading racks to transfer objects thereto.

10. The system of claim 9 further comprising:
    an impediment structure coupled to the track and configured to cease movement of the automated dolly assembly along the track and align the automated dolly assembly with the rack assembly by causing the receiver arm to disengage from the overhead conveyor.

11. The system of claim 9, wherein the mobility mechanism comprises a plurality of wheels.

12. The system of claim 9, wherein engagement of the receiver arm to the overhead conveyor causes the weights of the moveable pulley to be raised as the moveable frame moves with the overhead conveyor and movement of the receiver arm to a horizontal position releases the movable frame from the overhead conveyor and causes the weights of the moveable pulley to lower thereby returning the moveable frame to an initial position.

13. The system of claim 9, wherein the automated dolly assembly further comprises:
    a firing mechanism comprising a regulated air cylinder and a valve for moving the receiver arm; and
    a switch disposed on the moveable frame to control the movement of the receiver arm.

14. The system of claim 9, wherein the moveable frame of the automated dolly assembly further comprises a height configured to align with the rack assembly such that objects from the one or more loading racks of the automated dolly assembly are transferred to the one or more unloading shelves of the rack assembly and objects from the one or more loading shelves of the rack assembly are transferred to the one or more unloading racks of the automated dolly assembly.

15. A system comprising:
    an automated dolly assembly comprising:
       a moveable frame comprising:
          a mobility mechanism coupled to a bottom surface of the moveable frame;
          one or more loading racks and one or more unloading racks proximate to a top surface of the moveable frame; and
          a receiver arm connected to the moveable frame, the receiver arm rotatably moveable between a horizontal position and a vertical position; and
          a moveable pulley located at and coupled to the moveable frame so as to move with the moveable frame, the moveable pulley comprising weights and connected to the receiver arm;
       a rack assembly comprising:
          one or more loading shelves configured to align with the one or more unloading racks to receive objects therefrom; and
          one or more unloading shelves configured to align with the one or more loading racks to transfer objects thereto;
       a track secured to a floor and configured to accommodate the mobility mechanism; and
       an overhead conveyor configured to be engaged with the automated dolly assembly when the receiver arm is in a vertical position to move the automated dolly assembly including the moveable pulley along the track.

16. The system of claim 15 further comprising:
    an impediment structure coupled to the track and configured to cease movement of the automated dolly assembly along the track and align the automated dolly assembly with the rack assembly by causing the receiver arm to disengage from the overhead conveyor.

17. The system of claim 15, wherein the mobility mechanism comprises a plurality of wheels.

18. The system of claim 15, wherein engagement of the receiver arm to the overhead conveyor causes the weights of the moveable pulley to be raised as the moveable frame moves with the overhead conveyor and movement of the receiver arm to a horizontal position releases the movable frame from the overhead conveyor and causes the weights of the moveable pulley to lower thereby returning the moveable frame to an initial position.

19. The system of claim 15, wherein the automated dolly assembly further comprises:
    a firing mechanism comprising a regulated air cylinder and a valve for moving the receiver arm; and
    a switch disposed on the moveable frame to control the movement of the receiver arm.

20. The system of claim 15, wherein the moveable frame of the automated dolly assembly further comprises a height configured to align with the rack assembly such that objects from the one or more loading racks of the automated dolly assembly are transferred to the one or more unloading shelves of the rack assembly and objects from the one or more loading shelves of the rack assembly are transferred to the one or more unloading racks of the automated dolly assembly.

* * * * *

UNITED STATES PATENT AND TRADEMARK OFFICE
CERTIFICATE OF CORRECTION

PATENT NO. : 11,117,752 B2
APPLICATION NO. : 16/688524
DATED : September 14, 2021
INVENTOR(S) : Scottie L. Foster et al.

Page 1 of 1

It is certified that error appears in the above-identified patent and that said Letters Patent is hereby corrected as shown below:

In the Specification

In Column 4, Line(s) 59, after "horizontal position", insert --.--.

In the Claims

In Column 7, Line(s) 6, Claim 7, after "claim 1", insert --,--.

In Column 7, Line(s) 46, Claim 10, after "claim 9", insert --,--.

In Column 8, Line(s) 40, Claim 16, after "claim 15", insert --,--.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*